Oct. 5, 1926. 1,602,152
G. A. GILLEN
WHEEL LOCK
Filed May 10, 1923

INVENTOR
George A. Gillen
BY
ATTORNEY

Patented Oct. 5, 1926.

1,602,152

UNITED STATES PATENT OFFICE.

GEORGE A. GILLEN, OF JERSEY CITY, NEW JERSEY, ASSIGNOR TO GILLEN, KIMMEY, BAKER SYNDICATE, INC., OF NEW YORK, N. Y., A CORPORATION OF NEW YORK.

WHEEL LOCK.

Application filed May 10, 1923. Serial No. 638,137.

This invention relates to improvements in wheel locks and has for its object to provide a simple and efficient means to lock the steering wheel of a motor vehicle to the steering column so as to prevent theft of the vehicle or the driving thereof by an unauthorized person.

Another object of the invention resides in the provision of a lock wherein all of the parts constituting the lock are effectively tied together as a unit and to the steering column.

As a further object the invention contemplates the provision of a pair of forked elements arranged when in locking position to engage the spokes of the spider of the steering wheel and to partly enclose portions of the guide element and cover certain of the attaching screws.

With the above and other objects in view which will become more apparent as the description proceeds, the invention consists in the novel construction, combination and arrangement of parts which will be fully set forth in the following specification, claimed and illustrated in the accompanying drawing in which:—

Figure 1:
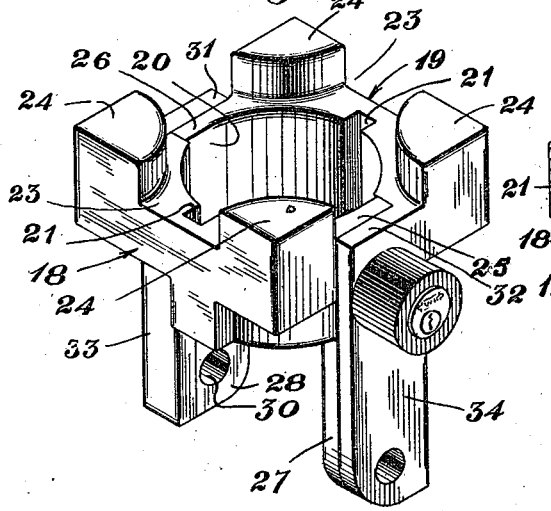
Figure 1 is a perspective view of the locking elements of this wheel lock showing the parts in locked position.
Figure 4:
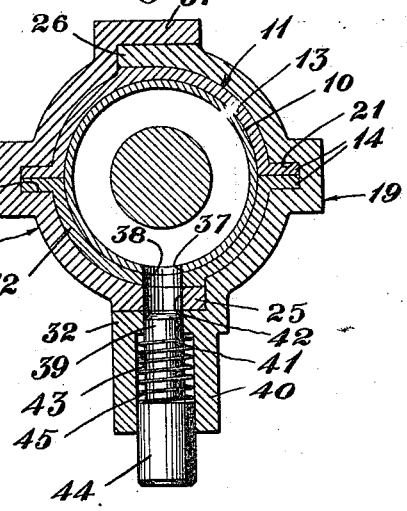
Figure 4 is a horizontal sectional view taken on line 4—4 of Figure 3.
Figure 2:
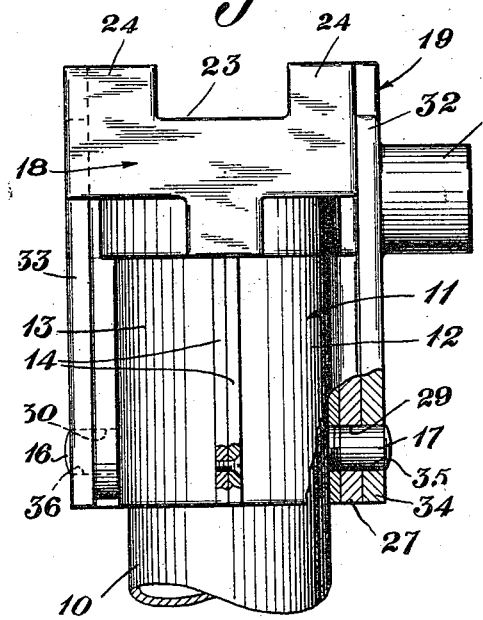
Figure 2 is a side view of the device on a steering column showing portions broken away to more clearly illustrate the details of construction.
Figure 3:
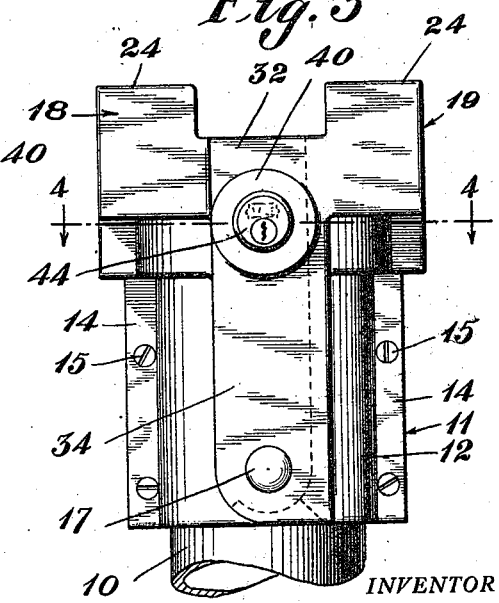
Figure 3 is front view of the lock.

Referring to the drawings in detail, the numeral 10 designates the steering column carrying at its upper end the customary steering wheel (not shown).

Fitted around the column near its upper end is a collar member designated generally by the numeral 11 and comprising a pair of semi-circular sections 12 and 13 each of which is provided at its abutting edge with an attaching flange 14. These flanges 14 are pierced to receive screws 15 by means of which the collar member is held assembled around the column 10.

Extending outwardly from the section 13 near its lower end and intermediate the flanges 14 thereof is a stud 16 while a similar stud 17 is arranged in the section 12 at a diametrically opposite point. It is to be understood that for the purpose of assembly, one or both of these studs may be threaded into openings in their respective collar sections.

The wheel locking device comprises a pair of bodies each of which is respectively designated by the numerals 18 and 19.

These bodies are each recessed as at 20 to fit around the collar 11 and are provided with longitudinal grooves 21 to accommodate the flanges 14.

Formed at the upper ends of the bodies 18 and 19 are heads 22 which are notched as at 23 to provide upwardly extending lugs 24 for engagement between the spokes of the steering wheel spider (not shown).

Extending in parallel relation from the bodies 18 and 19 respectively are the inner flange elements 25 and 26 which are provided with downwardly extending arms 27 and 28 formed near their lower ends respectively with openings 29 and 30 for the reception of the studs 17 and 16 respectively. Overlapping flanges 31 and 32 are formed respectively on the bodies 18 and 19 and are adapted to overlie the flanges 25 and 26 when the device is in locked position as clearly shown in Figure 1. Like the flanges 25 and 26 the flanges 31 and 32 are formed with downwardly extending arms 33 and 34 which are also formed adjacent their lower ends with openings 35 and 36 for the reception of the studs 17 and 16 respectively. It will thus be seen that the flanges 25 and 26 as well as the arms 27 and 28 will be covered by the flanges 31 and 32 and the arms 33 and 34 respectively when the device is in locked position.

In order to hold the parts locked upon and to the steering column, said column is provided with an opening 37 arranged in alinement with an opening 38 in the collar 11 which openings are adapted to receive the locking bolt 39 mounted in the barrel 40 formed on the body 19.

The barrel 40 is formed with an opening 41 to accommodate the bolt which opening alines with an opening 42 formed in the flange 25 and communicates at its opposite end with an enlarged bore 43 for the reception of the housing 44 of a suitable pin tumbler lock mechanism by means of which the bolt is retained in locked position. A spring 45 is arranged within the bore 43 around the bolt 39 and yieldably holds the bolt in withdrawn position when the device is unlocked.

While in the foregoing there has been shown and described the preferred embodiment of this invention it is to be understood that minor changes in the details of construction, combination and arrangement of parts may be resorted to without departing from the spirit and scope of this invention as claimed.

What I claim is:—

1. A steering wheel lock comprising locking elements pivotally associated with a steering column and adapted when locked to embrace said column, a bolt carried by one of said elements and adopted to be projected through the cooperating element and into the steering column to lock the locking elements to and around the column and in position to engage a steering wheel to prevent the same from turning relative to the column.

2. A steering wheel lock comprising locking elements pivotally associated with a steering column and adapted when locked to embrace said column, said column being provided with an opening, a bolt carried by one of the locking elements and adapted to be moved into alinement with the opening in the column, the co-operating locking element being provided with an opening adapted to be moved in alinement with the bolt, whereby when the locking elements are moved into active position the bolt may be projected through the openings and the elements locked about and to the column.

3. A steering wheel lock comprising a collar fitted around a steering column, locking elements pivoted to the collar, wheel spider engaging lugs on the free ends of the locking elements, and a bolt to lock the locking elements to the column in such position as to embrace the column and cause the lugs to engage the spider of a steering wheel to prevent the same from turning relative to the column.

4. A steering wheel lock comprising a collar fitted around a steering column, column embracing locking elements pivoted to the collar, a bolt carried by one of said locking elements, the other locking element having an opening therein, the collar and steering column both being provided with aligning openings whereby when the locking elements are in position to engage a steering wheel the column will be embraced and the bolt may be projected through the opening to lock the parts together to and around the column.

In testimony whereof I have signed my name to this application.

GEORGE A. GILLEN.